(12) United States Patent
Schettel et al.

(10) Patent No.: US 8,152,206 B2
(45) Date of Patent: Apr. 10, 2012

(54) SECURING DEVICE FOR A LOAD SYSTEM IN A CARGO COMPARTMENT OF AN AIRCRAFT, COMPRISING AT LEAST ONE SECURING CATCH

(75) Inventors: Fred Schettel, Thedinghausen (DE); Jens-Christoph Hayunges, Hamburg (DE); Stefan Ackerstaff, Leer (DE); Torsten Kaatz, Bassum (DE)

(73) Assignee: Airbus Operations GmbH (DE)

( * ) Notice: Subject to any disclaimer, the term of this patent is extended or adjusted under 35 U.S.C. 154(b) by 1095 days.

(21) Appl. No.: 11/990,364

(22) PCT Filed: Aug. 10, 2006

(86) PCT No.: PCT/EP2006/007932
§ 371 (c)(1),
(2), (4) Date: Feb. 11, 2008

(87) PCT Pub. No.: WO2007/017283
PCT Pub. Date: Feb. 15, 2007

(65) Prior Publication Data
US 2009/0224101 A1    Sep. 10, 2009

(30) Foreign Application Priority Data
Aug. 11, 2005 (DE) .......... 10 2005 037 988

(51) Int. Cl.
*B60P 1/64* (2006.01)
*B63B 25/00* (2006.01)
(52) U.S. Cl. ............... 292/2; 292/340; 410/77; 410/80; 244/118.1

(58) Field of Classification Search ............. 292/2, 340, 292/341.15, 341.17; 244/118.1; 410/77–80, 410/90, 91, 94
See application file for complete search history.

(56) References Cited

U.S. PATENT DOCUMENTS

| | | | | |
|---|---|---|---|---|
| 1,895,146 A * | 1/1933 | Brown | ......................... | 292/228 |
| 3,424,410 A | 1/1969 | Galaup | | |
| 3,799,064 A * | 3/1974 | Kikuchi et al. | ............... | 104/256 |
| 3,800,713 A | 4/1974 | Nordstrom | | |
| 3,805,322 A * | 4/1974 | Serrano | ............................. | 16/82 |
| 3,933,101 A | 1/1976 | Blas | | |
| 3,995,562 A | 12/1976 | Nordstrom | | |
| 4,134,345 A * | 1/1979 | Baldwin et al. | ................. | 410/70 |
| 4,797,970 A * | 1/1989 | Charlton | ........................... | 16/82 |
| 5,104,064 A * | 4/1992 | Kuitems | ..................... | 244/118.1 |
| 5,265,991 A * | 11/1993 | Herrick et al. | ................... | 410/69 |
| 5,356,250 A * | 10/1994 | Vogg et al. | ..................... | 410/86 |
| 5,433,564 A * | 7/1995 | Sundseth | ........................ | 410/77 |
| 5,775,746 A * | 7/1998 | Charlton | ....................... | 292/219 |

FOREIGN PATENT DOCUMENTS

| | | |
|---|---|---|
| DE | 2 132 189 | 1/1973 |
| DE | 23 64 270 A1 | 6/1975 |
| DE | 24 32 245 A1 | 1/1976 |
| DE | 30 27 160 A1 | 2/1982 |
| EP | 382458 A1 * | 8/1990 |
| SU | 656282 A2 | 10/1996 |
| SU | 1297379 A1 | 10/1996 |

\* cited by examiner

*Primary Examiner* — Carlos Lugo
(74) *Attorney, Agent, or Firm* — Lerner, David, Littenberg, Krumholz & Mentlik, LLP

(57) ABSTRACT

A securing device for a loading system in a cargo compartment of an aircraft. The securing device comprises at least one securing catch arranged in the region of a cargo compartment door, a control mechanism and an activation member, in particular a foot pedal.

13 Claims, 6 Drawing Sheets

Figure 1:
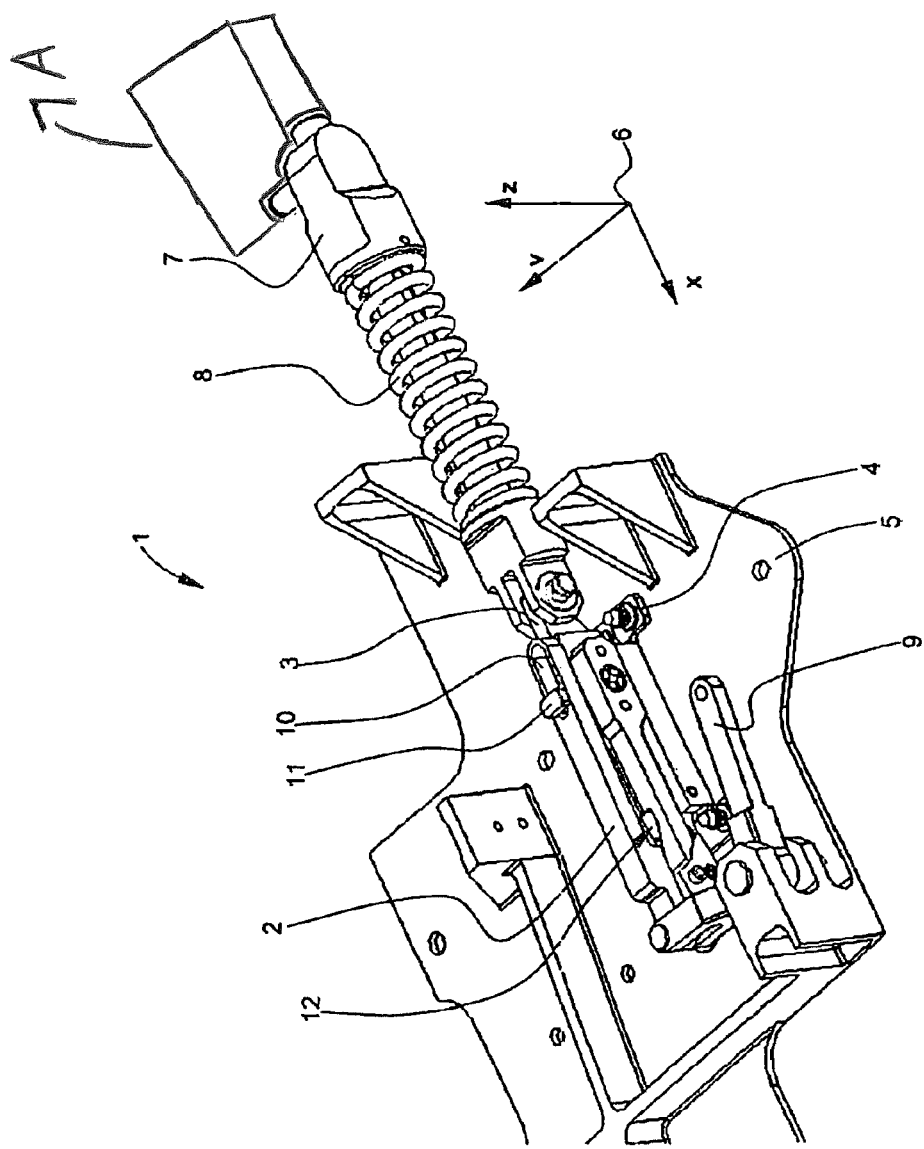

SECURING DEVICE FOR A LOAD SYSTEM IN A CARGO COMPARTMENT OF AN AIRCRAFT, COMPRISING AT LEAST ONE SECURING CATCH

This application claims the benefit of the filing date of the German Patent Application No. 10 2005 037 988.5 filed Aug. 11, 2005, the disclosures of which is hereby incorporated herein by reference.

The invention relates to a securing device for a loading system in a cargo compartment of an aircraft, comprising at least one securing catch arranged in the region of a cargo compartment door, a control mechanism and an activation member, in particular a foot pedal.

In aircraft the cargo to be transported is usually packed on pallets or in freight containers. The pallets or freight containers can easily be moved, within the cargo compartment of the aircraft, on a loading system with rollers. In order to prevent pallets or freight containers from rolling out of the cargo compartment in an uncontrolled manner, in the region of the cargo compartment door there are securing catches, which in a secured position protrude above the cargo compartment plane. If the pallets or freight containers are to be unloaded, the securing catches are moved to a position that is below the cargo compartment plane and that makes it possible to roll pallets or freight containers over said securing catches.

In known mechanical securing devices for cargo compartment doors, activation of the securing catches takes place by a hand lever, which by way of a cable pull arrangement swings the securing catches underneath the cargo compartment plane against the force of a return spring. After this lowering procedure the securing catches and the hand lever are moved back to their original positions by means of the return spring, wherein this movement is delayed in time by a hydraulic damper so that the securing catches can temporarily be driven over by the pallets or the freight containers.

Activating the securing catches by means of cable pull arrangements is in particular associated with the disadvantage that during installation of the cable pull arrangements a multitude of design-related boundary conditions, for example in the form of bending radii, prescribed minimum distances from other systems or the like, have to be taken into account, which considerably increases production expenditure. Furthermore, if cable pull arrangements are not expertly installed, they can quickly wear and fail. Furthermore, in the case of low temperatures in the cargo compartment the hydraulic dampers that are used for delayed renewed righting of the securing catches can freeze so that the system blocks. Moreover, with the use of hydraulic dampers, generally speaking, the delay time until automatic renewed erecting that can be achieved is insufficient to rotate freight units, in particular freight containers or freight pallets, in the door region of the cargo compartment.

Furthermore, it is known to operate the securing catches by remote control by way of electrical drives or the like, which results in an increased failure risk during operation. Moreover, electrical drives and their regulating systems increase the weight of the entire securing device.

It is an object of the invention to create a securing device for cargo compartment doors, which securing device avoids the above-mentioned disadvantages of known designs of securing devices.

This object is met by a securing device for a loading system in a cargo compartment of an aircraft, comprising at least one securing catch, a control mechanism and an activation member comprising a foot pedal. The securing catch is arranged in the region of a cargo compartment door. In a secured position the securing catch, of which there is at least one, projects above a cargo compartment plane so as to prevent the freight units situated on the loading system from rolling out from the cargo compartment door. In a loading position the securing catch, of which there is at least one, can be swung beneath the cargo compartment plane so as to make it possible to roll out the freight units. By the control mechanism the securing catch, of which there is at least one, by activating the foot pedal, can alternately be placed so as to lock either in the secured position or in the loading position.

The securing device according to the invention can be operated easily in that in a secured position the securing catch, of which there is at least one, projects above a cargo compartment plane so as to prevent the freight units situated on the loading system from rolling out from the cargo compartment door, and in that the securing catch, of which there is at least one, in a loading position can be swung beneath the cargo compartment plane so as to make it possible for the freight units to be rolled out, wherein by means of the control mechanism the securing catch, of which there is at least one, by activating the foot pedal, can alternately be placed so as to lock either in the secured position or in the loading position. Furthermore, the purely mechanical process control system, by way of the control mechanism of the securing device, makes possible a failsafe operation under all specified environmental conditions.

An advantageous embodiment of the securing device provides for the control mechanism to comprise a catch slide that can be activated by means of the foot pedal, by means of which catch slide an activation slide for swinging the securing catch, of which there is at least one, can be moved. This embodiment makes it possible, within certain limits, to position the activation slide independently of the position of the catch slide so that, for example, locking operation is possible.

According to a further advantageous embodiment the activation slide comprises an elongated hole in which a catch pin that is arranged on the catch slide is movably accommodated. In this way the catch slide, for example when the activation slide is locked into place, can slide back to its home position.

A further advantageous embodiment of the securing device provides for the activation slide to be arrestable in the loading position by means of a locking detent. In this way a user can release the foot pedal when the loading state has been attained.

Further advantageous embodiments of the securing device are explained in the further claims.

In the drawing show

Figure 2:
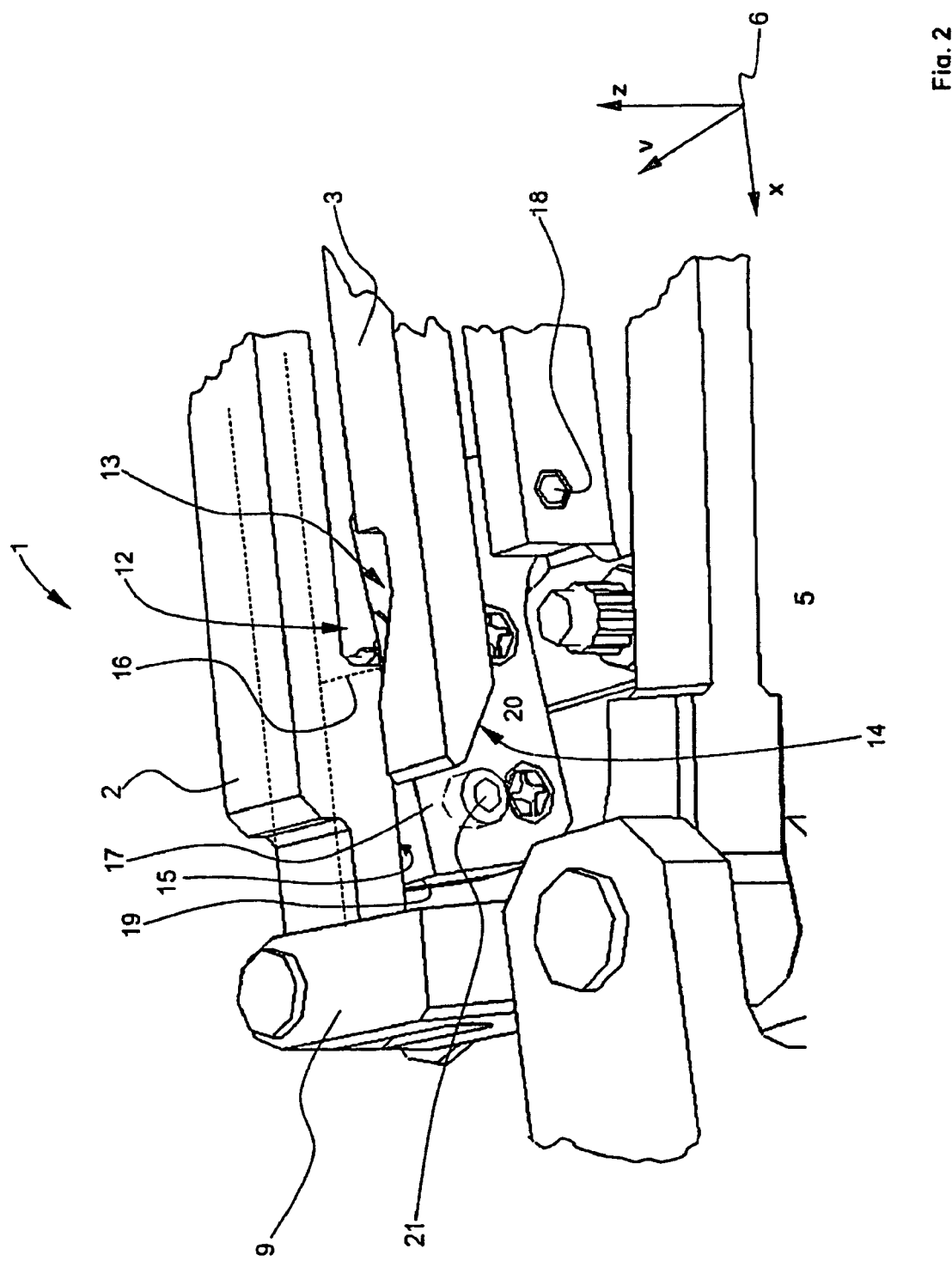
Figure 3:
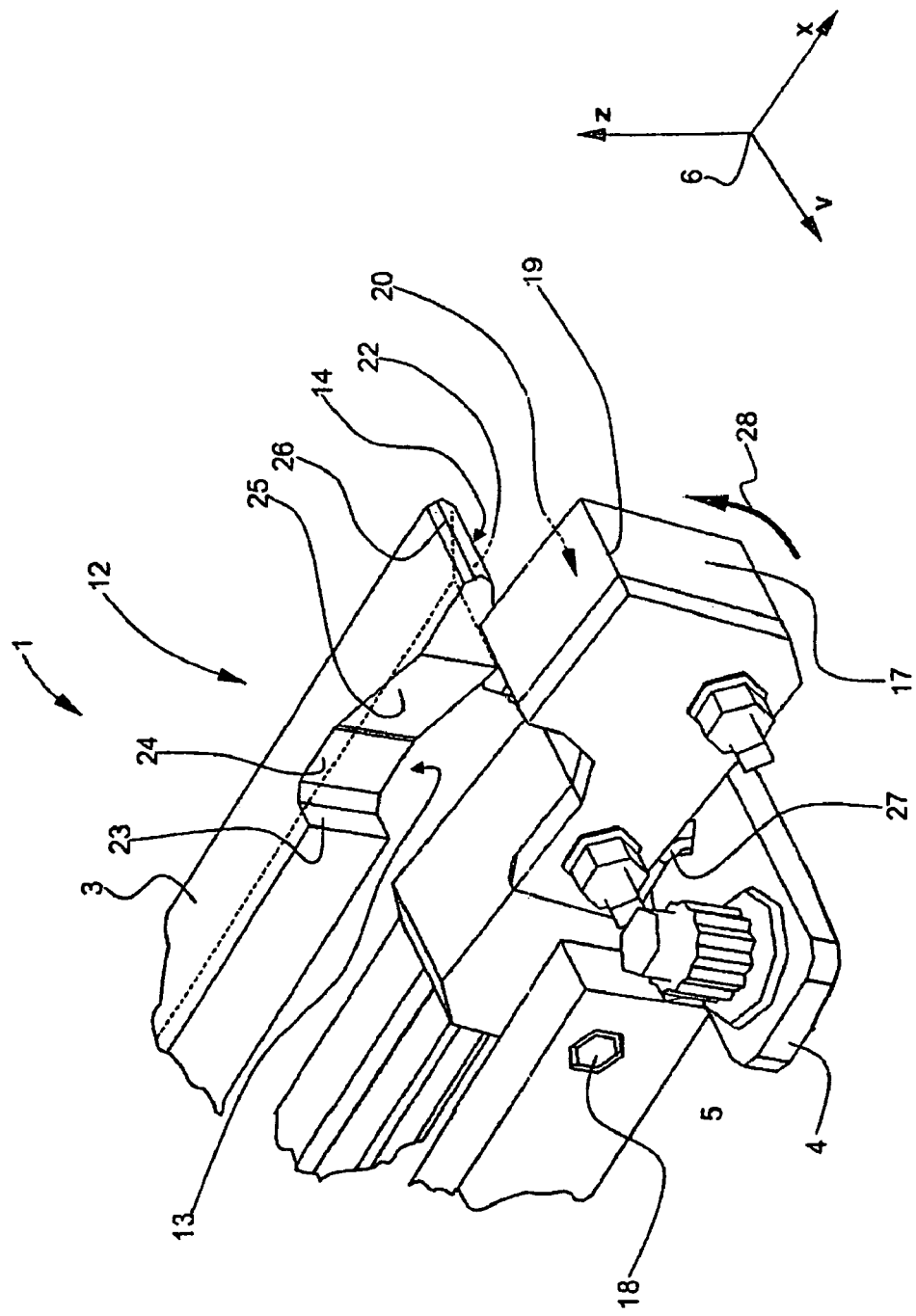
Figure 4:
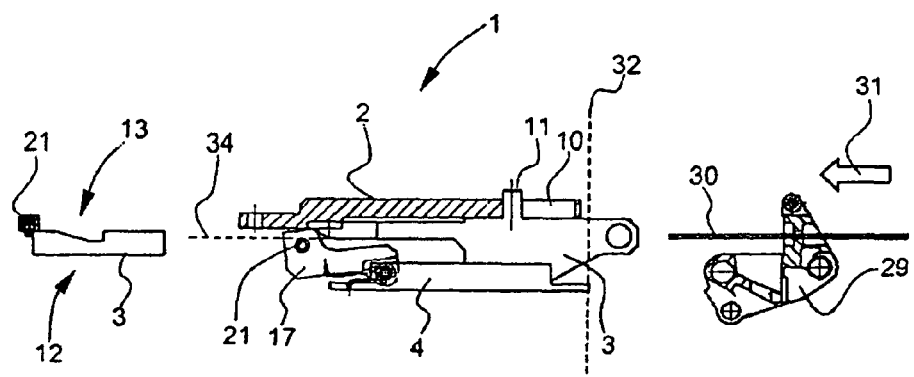
Figure 5:
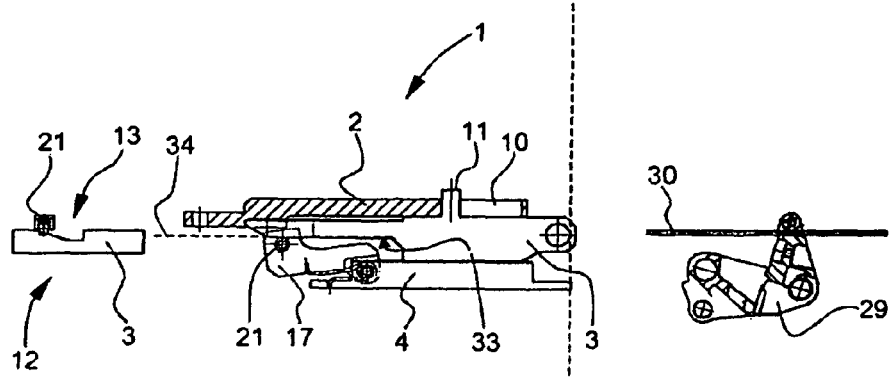
Figure 6:
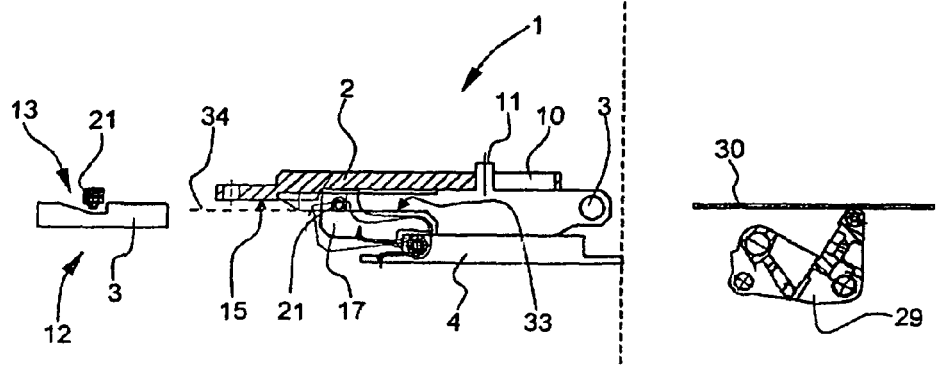
Figure 7:
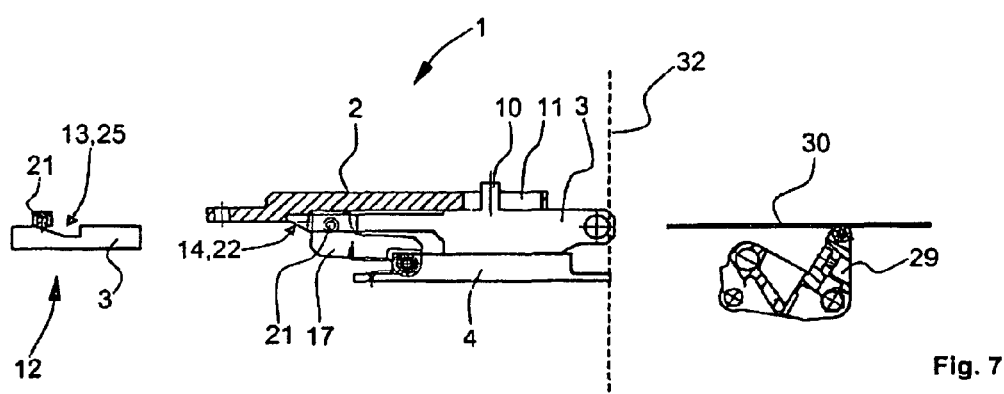
Figure 8:
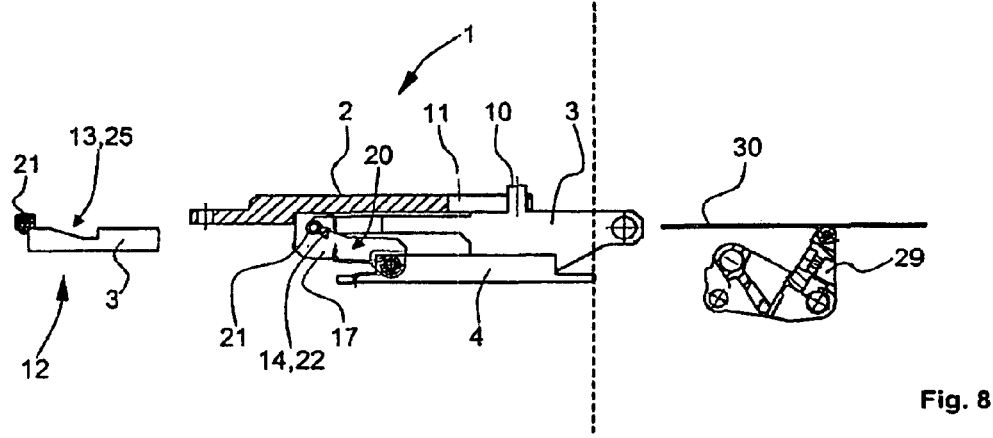
Figure 9:
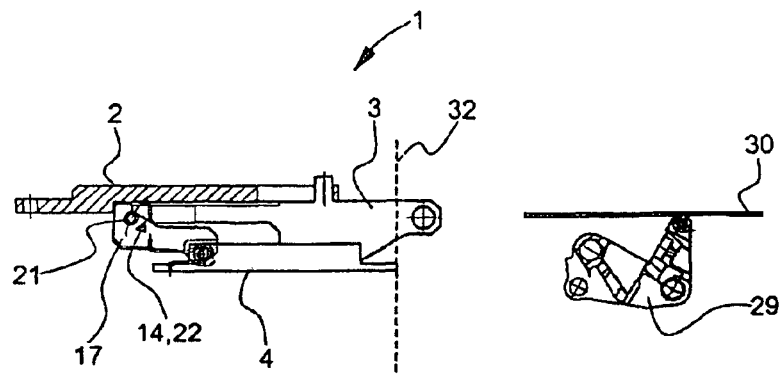
Figure 10:
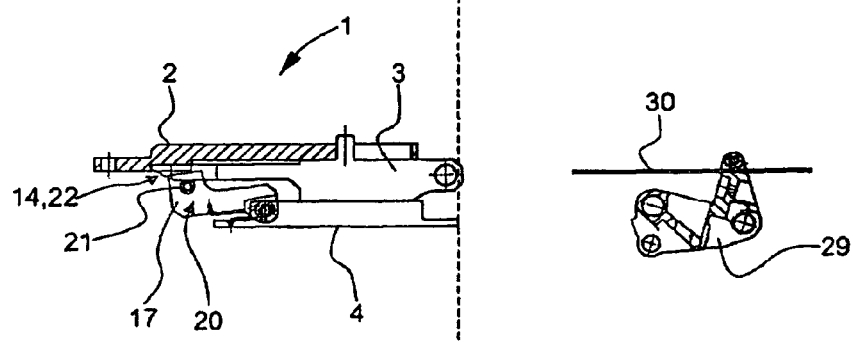
Figure 11:
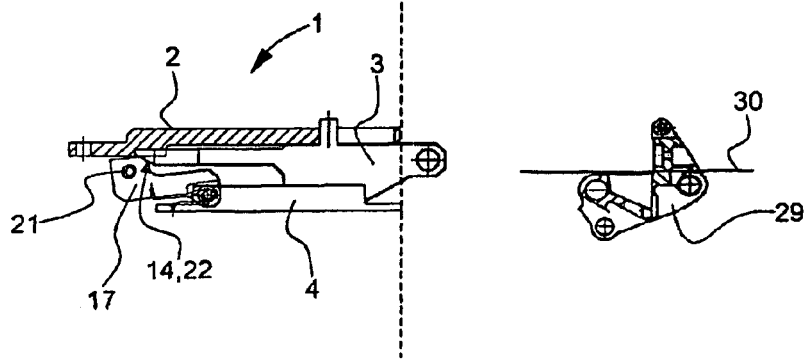

FIG. 1 a perspective view of the control mechanism of the securing device;

FIG. 2 a perspective detailed view of the control mechanism;

FIG. 3 a perspective detailed view of an end region of a catch slide;

FIGS. 4-6 a schematic representation of the lowering procedure of the securing catch for attaining the loading state;

FIGS. 7-8 a schematic representation of the return procedure of the catch slide;

FIGS. 9-11 a schematic representation of the erection process of the securing catch for re-attaining the secured state.

Same constructive elements in the drawing have the same reference characters.

FIG. 1 shows a perspective view of the control mechanism 1. By means of a bearing arrangement 4, an activation slide 2 and a catch slide 3 are accommodated on a base plate 5 so as to be slideable parallel to the x-axis of a coordinate system 6. By means of a push rod 7, a spring 8 as well as other levers (not shown), the catch slide 3 is mechanically coupled to an activation member 7A, for example a foot pedal. The activation slide 2 in turn is coupled in a jointed manner to a lever 9. Further transmission elements (not shown in FIG. 1) are connected in a jointed manner to the lever 9, by means of which transmission elements it is also possible to activate securing catches (see, e.g., FIGS. 4-11), i.e. to lower them beneath a cargo compartment plane, and to swing them above said cargo compartment plane so as to secure the freight units rolling on said cargo compartment plane.

In a preferred embodiment of the securing device according to the invention, connection between the foot pedal and the catch slide 3 takes place by way of a lever gear arrangement. Correspondingly, mechanical coupling between the activation slide 2 and the securing catch, of which there is at least one, is also achieved by way of a gear arrangement, in particular by way of a lever gear arrangement. Consequently the securing catch, of which there is at least one, can be remotely activated by means of the foot pedal, i.e. it can be swung beneath the level of the cargo compartment plane.

An elongated hole 10 is embedded in the activation slide 2. The elongated hole 10 accommodates a catch pin 11 in a movable manner parallel in relation to the x-axis. If the catch slide 3 moves to the left in the direction of the x-axis, the catch pin 11 takes the activation slide 2 along in the same direction, as a result of which the lever 9 is swung and the securing catches are lowered by way of the lever mechanism (not shown in detail). Furthermore, the catch slide 3 comprises an end region 12.

FIG. 2 shows a perspective detailed view of the control mechanism. In order to clarify the spatial orientation, the coordinate system 6 is again shown. The end region 12 of the catch slide 3 comprises a recess 13 and a ramp 14. At its underside 15 the activation slide 2 comprises a lock-in edge 16. Furthermore, on the base plate 5 a locking detent 17 is accommodated so that it can swing on a pivot 18. As a result of the effect of a rotary spring (not shown in FIG. 2) the locking detent 17 always attempts to move upwards in the direction of the z-axis, i.e. to erect. The direction of movement of the activation slide 2 and of the catch slide 3 essentially extends parallel in relation to the x-axis. The locking detent 17 comprises a lock-in edge 19. If as a result of a user operating the foot pedal the activation slide 2 moves in the direction of the x-axis, then the lock-in edge 19 of the locking detent 17 locks behind the lock-in edge 16, thus locking the activation slide 2 in a so-called loading position in which the securing catches are swung beneath the level of the cargo compartment plane so that overlying freight units can be rolled to and fro. Thereby, the securing catches are again activated by means of the lever 9 as well as by means of further transmission members (for the sake of clarity not shown in the diagram).

A side face 20 of the locking detent 17 resiliently accommodates an unlocking pin 21. In this arrangement the unlocking pin 21 can move in a sprung manner approximately parallel in relation to the y-axis, i.e. essentially perpendicularly in relation to the side face 20. In the state shown, the unlocking pin 21 protrudes. somewhat beyond the side face 20, but it can be pushed into the locking detent 17 to the extent that said unlocking pin 21 closes off approximately flush with the side face 20.

FIG. 3 shows a perspective detailed view of the end region 12 of the catch slide 3 with the locking detent 17, wherein for the sake of clarity the activation slide 2 has been left out in the drawing. To clarify the spatial orientation, the base plate 5 and the coordinate system 6 are again shown.

The ramp 14 comprises a slide face 22, which extends approximately at an angle of about 45° in relation to the plane defined by the x-axis and the y-axis. The recess 13 comprises a partial face 23, which extends so as to be approximately perpendicular in relation to the side face 20 of the catch slide 3. Furthermore, the recess 13 comprises a base surface 24, which is arranged so as to be approximately parallel in relation to the side face 20. A slide face 25 continues from the base surface 24 and extends approximately at an angle of 30° in relation to the side face 20. Angles other than those with the above-mentioned values are possible. The ramp 14 further comprises a rounded edge 26.

By means of the lock-in edge 19 the locking detent 17 locks behind the lock-in edge (not shown in FIG. 3) of the activation slide 2 (compare FIG. 2). The locking detent 17 is accommodated so that it can swing in the pivot 18, wherein as a result of the effect of the spring 27 the locking detent 17 always attempts to move upwards in the direction of the arrow 28. This ensures that the lock-in edge 19 always rests with defined pre-tension against the underside 15 of the not shown activation slide 2. By means of the bearing arrangement 4, both the activation slide 2 and the catch slide 3 are accommodated on the base plate 5 so as to be slideable essentially parallel in relation to the x-axis.

For a more detailed description of the movement sequence during the locking switch-over procedure between the secured position and the loading position of the control mechanism, reference is made to FIGS. 4 to 11.

FIGS. 4 to 6 schematically show the control mechanism 1 of the securing device according to the invention during the transition from the secured position to the loading position.

The left-hand column shows the respective position of the unlocking pin 21 in relation to the end region 12 with the recess 13 of the catch slide 3, seen from above, i.e. from the z-direction (compare FIG. 1). The middle column shows the respective positions of the activation slide 2, of the catch slide 3, of the catch pin 11 in the elongated hole 10, as well as the position of the locking detent 17 with the unlocking pin 21. Finally, by way of an example, the right-hand column illustrates the position of the only securing catch 29 in relation to a cargo compartment plane 30. As an alternative it is possible to position any desired number of securing catches along a cargo hold door. A perpendicular auxiliary line 32 serves to establish a relationship between the above-mentioned components and the bearing arrangement 4 as a fixed reference point.

In FIG. 4 the control system 1 is in the secured position, i.e. the securing catch 29 is, or the security catches are, swung above the level of the cargo compartment plane 30. In this secured position, due to the raised securing catches 29, freight units such as for example freight containers or freight pallets cannot roll in an uncontrolled manner out of a cargo compartment door. However, in the direction of the arrow 31, the securing catch 29 is designed so that objects can drive over it, so that even with the securing catch 29 in its secured position freight units can be moved from the outside into the cargo compartment of the aircraft.

If the securing catch 29 is to be lowered below the level of the cargo compartment plane 30, the user operates a foot pedal (not shown), and the catch slide 3 slides towards the left as shown in FIG. 5. In this procedure the catch pin 11, which is slideably accommodated within the elongated hole 10, slides the activation slide 2 in the same direction, as a result of which the securing catch 29 lowers itself progressively further beneath the level of the cargo compartment plane 30. Thereby, a mechanical coupling between the securing catch 29 and the activation slide 2 is realized by way of a lever mechanism (not shown). In this procedure a underside 33 of the catch slide moves over the unlocking pin 21, as shown by a horizontal auxiliary line 34. During this procedure the locking detent 17 does not change its position. If the foot pedal is pressed further (compare FIG. 6), then the activation slide 2 and the catch slide 3 continue to move to the left just about a small distance so that the locking detent 17 jumps up and locks into the underside 15 of the activation slide 2. As a result of this the activation slide 2 is arrested in the position shown, and the securing catch 29 is in the loading position, in other words in the state where it has been lowered furthest beneath the level of the cargo compartment plane 30. In this position the unlocking pin 21 is situated in the recess 13 of the catch slide 3.

FIGS. 7 to 8 illustrate the return process of the catch slide 3 when the user releases the foot pedal. The left-hand column shows the respective position of the unlocking pin 21 in relation to the end region 12 of the catch slide 3 with the recess 13 and the associated slide face 25 seen from above, i.e. from the z-direction (compare in particular FIG. 1). The middle column shows the respective positions of the activation slide 2, of the catch slide 3, of the catch pin 11 in the elongated hole 10, as well as the position of the locking detent 17 with the unlocking pin 21. Finally, the right-hand column, by way of an example, illustrates the position of an individual securing catch 29 in relation to a cargo compartment plane 30. The vertical auxiliary line 32 serves to establish a relationship between the above-mentioned components and the bearing arrangement 4 as a fixed reference point.

During the return procedure the securing catch 29 remains swung underneath the level of the cargo compartment plane 30 because the activation slide 2, due to the locked-in locking detent 17, does not change its position in relation to the bearing arrangement 4 or to the auxiliary line 32 during the return process of the catch slide 3. As a result of the spring force of a spring (not shown) the catch slide 3 slides back into the right-hand end position shown in FIG. 8. In this procedure the unlocking pin 21 travels over the inclined slide face 25 of the recess 13 in the end region 12 of the catch slide 3, and during this procedure, due to its resilient bearing arrangement is pushed into the side face 20 of the locking detent 17 so that unlocking of the locking detent 17 is prevented by lowering said locking detent 17. In the end position shown in FIG. 8 the unlocking pin 21, which has been released by the slide face 25, jumps out of the locking detent 17 and rests against the ramp 14 in the region of the slide face 22.

FIGS. 9 to 11 schematically show the sequence during the transition from the loading position to the secured position with the completely raised securing catch. The left-hand column shows a schematic view of the positions of the control mechanism 1 with the activation slide 2, the catch slide 3, the locking detent 17, the unlocking pin 21, the bearing arrangement 4 and the auxiliary line 32, while the right-hand column shows the position of the securing catch 29 in relation to the cargo compartment plane 30.

In the illustration of FIG. 9 the control mechanism 1 is situated in the loading position, i.e. the securing catch 29 is in its lowest position in relation to the level of the cargo compartment plane 30 (compare FIG. 8). The activation slide 2 is still arrested by means of the locking detent 17. The catch slide 3 is in the outermost right-hand position in relation to the auxiliary line 32. If a user activates the foot pedal again so as to transfer the securing device from the loading state to the secured state, then the catch slide 3 moves to the left, as shown in FIG. 10. In this procedure the slide face 22 of the ramp 14 moves over the unlocking pin 21 that projects from the side face 20 of the locking detent 17, so that the locking detent 17 is lowered by the passing catch slide 3, and as a result of this the activation slide 2 is unlocked. The activation slide 2 that has been released by the locking detent 17 therefore moves to the right-hand side in relation to the auxiliary line 32 and swings the securing catch 29 above the level of the cargo compartment plane 30. The control mechanism 1 has thus attained the secured position in which the securing catch 29 has reached its highest position in relation to the level of the cargo compartment plane 30, and unintended rolling out of freight units or the like from the cargo hold is reliably prevented.

The position of the control mechanism 1 shown in FIG. 11 thus corresponds again to the position of the control mechanism shown in FIG. 4.

By means of the securing device according to the invention, which securing device can be activated so as to lock, freight units, in particular freight containers or freight pallets, can be rotated in the door region of the cargo compartment, because the securing catches, which by way of a foot pedal can conveniently be activated so as to lock, can dwell for any desired time in the loading position or in the secured position so that the rotation procedure of the freight unit can be fully completed.

LIST OF REFERENCE CHARACTERS

1 Control mechanism
2 Activation slide
3 Catch slide
4 Bearing arrangement
5 Base plate
6 Coordinate system
7 Push rod
8 Spring (push rod)
9 Lever
10 Elongated hole
11 Catch pin
12 End region
13 Recess
14 Ramp
15 Underside (activation slide)
16 Lock-in edge (activation slide)
17 Locking detent
18 Pivot
19 Lock-in edge (locking detent)
20 Side face (locking detent)
21 Unlocking pin
22 Slide face (ramp)
23 Partial face (recess)
24 Base surface (recess)
25 Slide face (recess)
26 Rounded edge
27 Spring (locking detent)
28 Arrow
29 Securing catch
30 Cargo compartment plane
31 Arrow
32 Auxiliary line
33 Underside (catch slide)
34 Auxiliary line

The invention claimed is:
1. A securing device for a loading system in a cargo compartment of an aircraft, comprising:
at least one securing catch;
a control mechanism; and
an activation member comprising a foot pedal;
wherein the securing catch is arranged in the region of a cargo compartment door;

wherein, in a secured position, the securing catch projects above a cargo compartment plane so as to prevent freight units situated on the loading system from rolling out of the cargo compartment door;

wherein, in a loading position, the securing catch can be swung beneath the cargo compartment plane so as to allow the freight units to roll out;

wherein, by the control mechanism, the securing catch can alternately be placed so as to lock either in the secured position or in the loading position by activating the foot pedal;

wherein the control mechanism comprises a catch slide that can be activated by the foot pedal, and an activation slide for swinging the securing catch, by which the catch slide can be moved;

wherein the activation slide comprises an elongated hole, in which a catch pin that is arranged on the catch slide is movably accommodated.

2. The securing device according to claim 1, wherein the activation slide and the catch slide are slideably accommodated in the region of a base plate.

3. The securing device according to claim 1, wherein the activation slide is lockable in the loading position by a locking detent.

4. The securing device according to claim 3, wherein the activation slide can be unlocked by lowering the locking detent.

5. The securing device according to claim 3, wherein the locking detent is accommodated on the base plate so that it can swing.

6. The securing device according to claim 3, wherein the locking detent can be held in contact with an underside of the activation slide by a spring.

7. The securing device according to claim 3, wherein the locking detent comprises an unlocking pin.

8. The securing device according to claim 7, wherein the unlocking pin is accommodated, substantially across a movement direction of the catch slide, in the locking detent in a resilient manner.

9. The securing device according to claim 1, wherein the catch slide comprises an end region with a recess and a ramp.

10. The securing device according to claim 7, wherein during the transition from the secured position to the loading position with the locking detent lowered, the unlocking pin slides past underneath the catch slide, and the unlocking pin is accommodated in the recess only when the locking detent locks in for arresting the catch slide.

11. The securing device according to claim 9, wherein during sliding back of the catch slide after the loading position has been reached, the unlocking pin slides past a slide face of the recess and of the ramp and in this procedure is pushed, approximately flush, into a side face of the locking detent so that the locking detent is not unlocked.

12. The securing device according to claim 11, wherein during sliding forward of the catch slide to transition the securing catch from the loading position to the secured position, the unlocking pin that projects beyond the side face of the locking detent slides along a slide face of the ramp, wherein the locking detent is lowered and the activation slide is unlocked.

13. The securing device according to claim 1, wherein the securing catch can be driven over from one end for placing freight units in the cargo compartment.

* * * * *